(12) United States Patent
Axe

(10) Patent No.: US 6,988,672 B2
(45) Date of Patent: Jan. 24, 2006

(54) VALVES

(75) Inventor: Richard James Axe, Yeovil (GB)

(73) Assignee: Honeywell Normalair-Garrett (Holdings) Limited, Yeovil (GB)

( * ) Notice: Subject to any disclaimer, the term of this patent is extended or adjusted under 35 U.S.C. 154(b) by 46 days.

(21) Appl. No.: 10/646,656

(22) Filed: Aug. 21, 2003

(65) Prior Publication Data
US 2004/0084543 A1 May 6, 2004

(30) Foreign Application Priority Data

| Aug. 21, 2002 | (GB) | ................................... | 0219448 |
| Aug. 27, 2002 | (GB) | ................................... | 0219807 |
| Aug. 30, 2002 | (GB) | ................................... | 0220161 |

(51) Int. Cl.
G05D 23/00 (2006.01)
F16K 31/00 (2006.01)

(52) U.S. Cl. .................. 236/101 R; 236/90; 236/99 K; 251/11; 137/76
(58) Field of Classification Search ............ 236/101 R, 236/99 K, 101 E, 90; 251/11; 137/76; 60/516, 60/517, 520, 523, 527
See application file for complete search history.

(56) References Cited

U.S. PATENT DOCUMENTS

| 3,032,058 A | | 5/1962 | Weese ........................ 137/468 |
| 4,131,142 A | * | 12/1978 | Barr et al. ................... 141/302 |
| 4,775,101 A | | 10/1988 | Hall ......................... 236/48 R |
| 5,188,287 A | | 2/1993 | Chamot ..................... 236/34.5 |
| 5,381,951 A | * | 1/1995 | Michel ....................... 236/34.5 |
| 5,738,276 A | | 4/1998 | Saur ......................... 236/92 C |

FOREIGN PATENT DOCUMENTS

GB 2274500 A * 7/1994

* cited by examiner

Primary Examiner—Marc Norman
(74) Attorney, Agent, or Firm—MacMillan, Sobanski & Todd, LLC

(57) ABSTRACT

A temperature sensitive valve (10) includes a body (11) affording a passageway (12) for fluid, a valve member (15) which is moveable relative to the body (11) between first and second positions to control the flow of fluid through the passageway (12), a retaining member (24) movable with the valve member (15) and being engageable with a holding device (21) to retain the valve member (15) in the first position whilst the temperature is below a threshold value, and there being a release actuator (30) movable when the temperature is at the threshold value to disengage the retaining member (24) and holding device (21), to permit the valve member (15) to move from the first to the second position.

20 Claims, 2 Drawing Sheets

VALVES

BACKGROUND OF THE INVENTION

This invention relates to a valve and more particularly to a temperature sensitive valve.

The invention has particularly been developed for use in environments where the valve may be subjected to mechanical shocks such that a valve member of the valve needs to be positively retained in an operating position so as to avoid unintentional valve member movement at least from the operating condition at temperatures below a threshold temperature at which the valve member is required to move from the operating condition.

BRIEF SUMMARY OF THE INVENTION

According to a first aspect of the invention we provide a temperature sensitive valve including a body affording a passageway for fluid, a valve member which is moveable relative to the body between first and second positions to control the flow of fluid through the passageway, a retaining member movable with the valve member and being engageable with a holding device to retain the valve member in the first position whilst the temperature is below a threshold value, and there being a release actuator movable when the temperature is at the threshold value to disengage the retaining member and holding device, to permit the valve member to move from the first to the second position.

Thus the valve member is positively retained in the first position until the temperature reaches the threshold value at which the release actuator acts to disengage the retaining member and holding device.

The valve may be of the kind in which the valve member is pivotal about a pivot axis relative to the body from the first to the second position, e.g. where the valve member is a flap which in the first position permits the substantially unimpeded flow of fluid through the passageway, and in the second position engages a valve seat at least substantially to close the passageway to the flow of fluid. However the invention may be applied to other kinds of valves as required.

Preferably, a biasing device is provided to bias the valve member towards the second position when the retaining member and holding device are disengaged. Such biasing device will also assist maintaining the valve member in the second position although this may also be assisted by fluid pressure within the valve body, exerted for example by fluid prevented from flowing through the passageway by the valve member.

Desirably, once the valve member of the valve has moved to the second position, the valve member remains in the second position even in the event that the temperature falls below the threshold valve.

In one embodiment at least one of the retaining member and holding device is moveable by the release actuator to allow the retaining member and holding device to disengage at the threshold temperature. For example the holding device may be a bifurcated holding element with resiliently deformable tangs and the retaining member may be a headed pin, the head of the pin being retained between tangs of the holding element until disengaged therefrom by the action of the release actuator.

Thus the release actuator may act to prise apart the retaining member and the holding device or may otherwise act.

In another example, the holding device may be a latch, e.g. provided by a pivoted part, the latch being moveable, e.g. by being pivoted, to release the retaining member which may be an edge or other formation of the valve member. In this example a latch biasing device may assist in retaining the holding device and retaining member in engagement until released by the action of the release actuator.

In yet another embodiment the holding device may be a generally channel shaped member with a re-entrant mouth which, when the valve member is in its first position engages with the retaining member to retain the valve member in the first position.

At the threshold temperature the release actuator may be arranged to urge limbs of the channel shaped member of the holding device apart to release the retaining member.

Preferably, the release actuator includes a thermally sensitive substance such as a wax, which expands as the temperature increases towards the threshold temperature, to move a moveable part to disengage the retaining member and holding device at the threshold temperature.

Although the release actuator may be mounted on the valve member, the release actuator may be otherwise mounted for example, on the body.

BRIEF DESCRIPTION OF THE DRAWINGS

Embodiments of the invention will now be described with reference to the accompanying drawings in which.

DETAILED DESCRIPTION OF THE INVENTION

Figure 1:
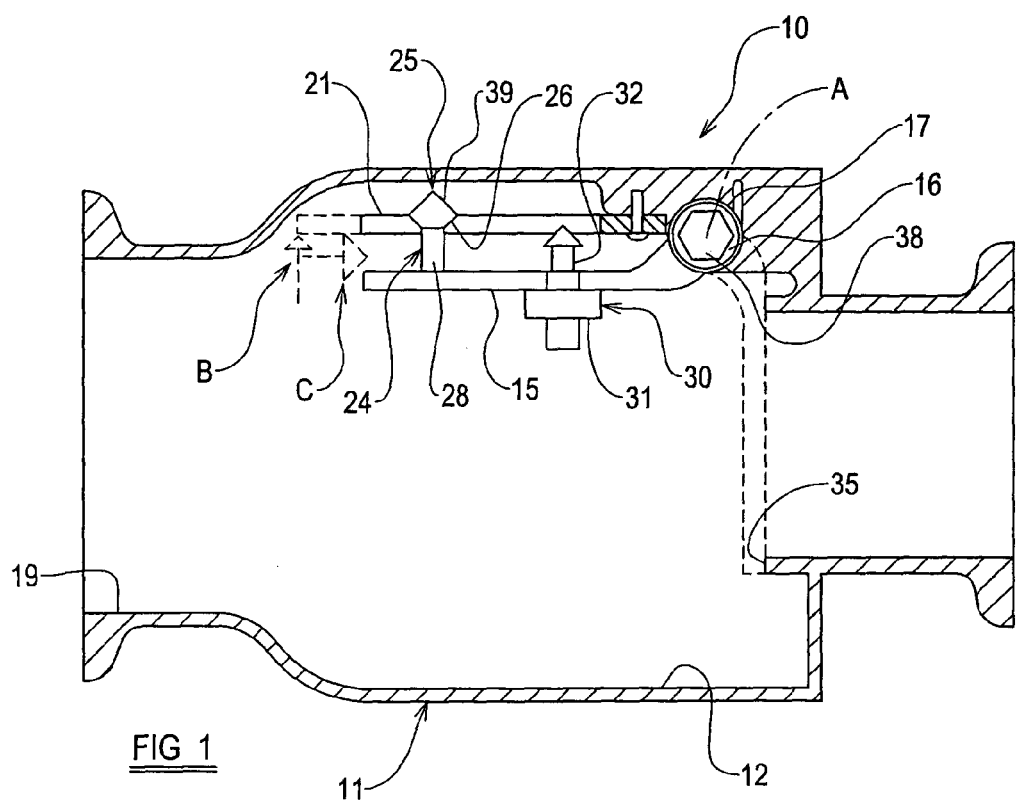
FIG. 1 is an illustrative diagram of a first embodiment of a valve in accordance with the invention.

Referring to the FIG. 1 of the drawings a valve 10 includes a valve body 11 which affords therethrough, a passageway 12 for fluid. In this example the flow of fluid is from left to right as seen in the drawing so that the pressure of fluid tends to move a valve member 15 from a first, fully open position in which the flow of fluid through the passageway is substantially unimpeded, towards a second closed position. In the drawing the valve member 15 is shown in the first position in full lines and in the second position in dotted lines.

The valve member 15 is a flap which is pivotal about a pivot axis A afforded by a shaft 16, from the first to the second position and in this example, there is a torsion spring 17 wound about the axis A, to bias the valve member 15 towards the second position.

The valve 10 is a temperature sensitive valve in that the valve member 15 is retained in the first position unless the temperature reaches a threshold temperature, at which the valve member 15 moves to the second position with the assistance of the spring 17 and the fluid pressure at an inlet 19 to the passageway 12.

The valve 10 of the embodiment described and shown is suitable for use in harsh environments, where the valve 10 may be subjected to mechanical shocks. Thus the valve member 15 needs positively to be retained in the first position so as not unintentionally to move to the second position.

To retain the valve member 15 in the first position a holding device 21 is provided which in this example is a bifurcated plate of resilient material such as spring steel. The valve member 15 carries a retaining member 24 which in this example is a headed pin, a head 25 of which in this example is bi-conical. When the valve member 15 is in its first position, the head 25 of the retaining member 24 is engaged with the holding device 21, between the tangs thereof, with one conical surface 26, which faces the valve member 15, supported by the tangs, and a pin 28 of the retaining member 24 passing between the tangs. In another arrangement, the holding device 21 need not be bifurcated, but a head 25 of the retaining member 24 may be supported otherwise by a holding device 21 positively to retain the valve member 15 in the first position.

The valve member 15 carries a release actuator 30 which in this example is a so-called wax-stat, which includes wax or another temperature sensitive material which expands with temperature increase, the wax or other material being contained in a reservoir 31. As the wax expands with increasing temperature, the wax acts on a moveable part 32 to extend the moveable part. The release actuator 30 is calibrated so that as temperature increases the moveable part 32 acts on the holding device 21 to disengage the retaining member 24 and holding device 21, the moveable part 32 acting to prise the holding device 21 and flap valve member 15 apart.

Because of the resilience of the holding device 21, or at least of the tangs thereof, and the conical surface 26 of the underside of the head 25, the tangs are movable to permit the head 25 to be disengaged from the tangs by the action of the release actuator 30. Release is arranged to occur at a threshold temperature.

When the head 25 and tangs of the holding device 21 are disengaged, the flap valve member 15 may move to the second position, into engagement with a valve seat 35 to close the valve 10 and prevent the further flow of fluid through the passageway 12, the spring 17 and pressure of fluid at the inlet 19 acting to retain the valve member 15 in its closed second position.

The valve member 15 may remain in the closed second position even though the temperature may subsequently decrease to below the threshold temperature, the valve 10 requiring a service operation to return the valve member 15 to the first position. For example, the shaft 16 may be rotated by a suitable tool engaging in a formation 38 at an end of the shaft 16, to return the valve member 15 to the first position. In another embodiment, some means for automatically returning the valve member 15 to the first position when the temperature decreases may be provided.

In each case, return of the head 25 to the retained first valve member 15 position is facilitated by the conical upper surface 39 of the head 25 which assists in resiliently deforming the tangs to permit the head 25 to pass as the valve member 15 is moved back to the first position.

The valve 10 described and shown has been designed particularly for controlling the flow of gaseous fluids such as air. More particularly the valve 10 is intended for controlling the flow of air to or in or from an air conditioning system to prevent air flow in the event that air upstream of the valve 10 is too hot to be provided downstream. Such condition is most likely to occur in the event of a malfunction of the air conditioning system such that closure of the valve 10 until a service operation is carried out would not be detrimental, and could ensure the protection of temperature sensitive equipment or of personnel downstream of the valve 10.

Various modifications may be made without departing from the scope of the invention.

For example, the retaining member 24 and holding device 21 may be of other configurations to that shown, provided that the valve member 15 is positively retained in the first position as shown, below the threshold temperature. The retaining member 24 may be an integral part of the valve member 15 and thus need not be carried thereby, but may otherwise be moveable with the valve member 15.

Figure 2:
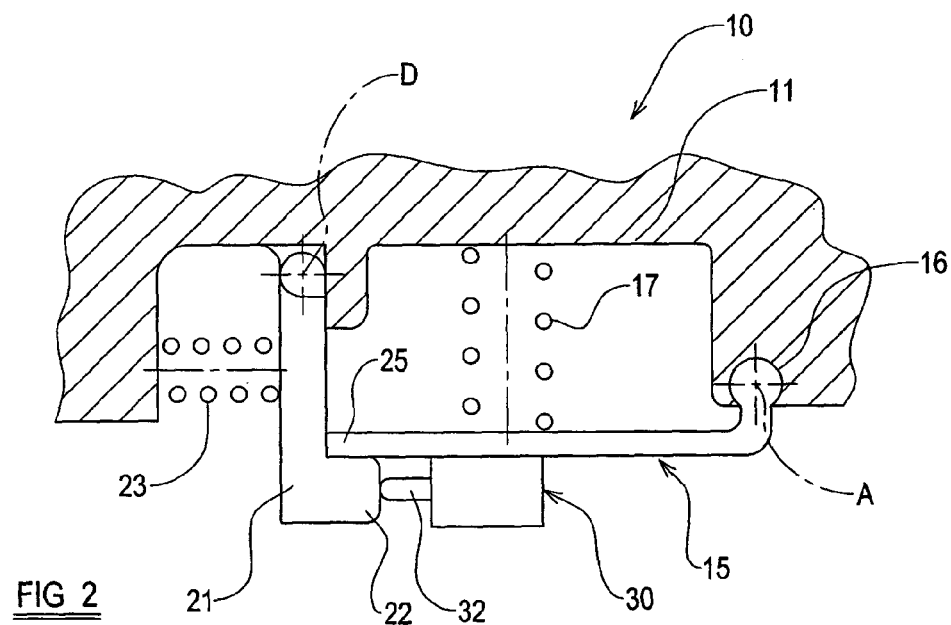
FIG. 2 is an illustrative diagram of part of a second embodiment of a valve in accordance with the invention.

For example, as indicated in FIG. 2 where an alternative embodiment is shown, and in which similar parts to those of the embodiment of FIG. 1 are indicated by the same references, the retaining member is provided by an edge formation of the valve member 15 at a position remote from the valve member pivot A, and in this example, the holding device 21 is a latch. The latch 21 is pivoted to the body 11 for movement about an axis D to release the valve member 15 when a threshold temperature is sensed by the release actuator 30.

In the FIG. 2 example, the latch 21 has a hook part 22 which engages under the retaining member 25 of the valve member 15, to retain the valve member 15 in the first position. The latch 21 is urged into its holding first position by a latch coil spring 23 which acts between the body 11 and the latch 21. However when the temperature rises to the threshold valve, the moveable part 32 of the release actuator 30 acts on the hook part 22 against the bias of the latch coil spring 23, to release the retaining member 25 to permit the valve member 15 to move to the second position (not shown in FIG. 2).

Other release actuator 30 constructions are possible to those described, and although as described in both embodiments, the release actuator 30 is carried by the valve member 15, the release actuator 30 may otherwise be mounted, for example on the body 11 as indicated in dotted lines, at B in FIG. 1, to act upon the holding device 21 only, rather than both the retaining member 24 and holding device 21, to effect prising apart of the holding device 21 and retaining member 24 at the threshold temperature. The release actuator 30, where mounted on the body 11 may act transversely to the usual fluid flow direction as indicated at C only on the holding device 21, or between the holding device 21 and valve member 15, in each case to prise the holding device 21 and retaining member 24 apart at the threshold temperature.

The latch biasing coil spring 23 in the FIG. 2 embodiment, could be an alternative biasing device, and as indicated in FIG. 2, the biasing device 17 for biasing the valve member 15 towards its second position when released from the first position, could be a coil spring rather than the torsion spring 17 shown in FIG. 1, or any other biasing device.

Figure 3:
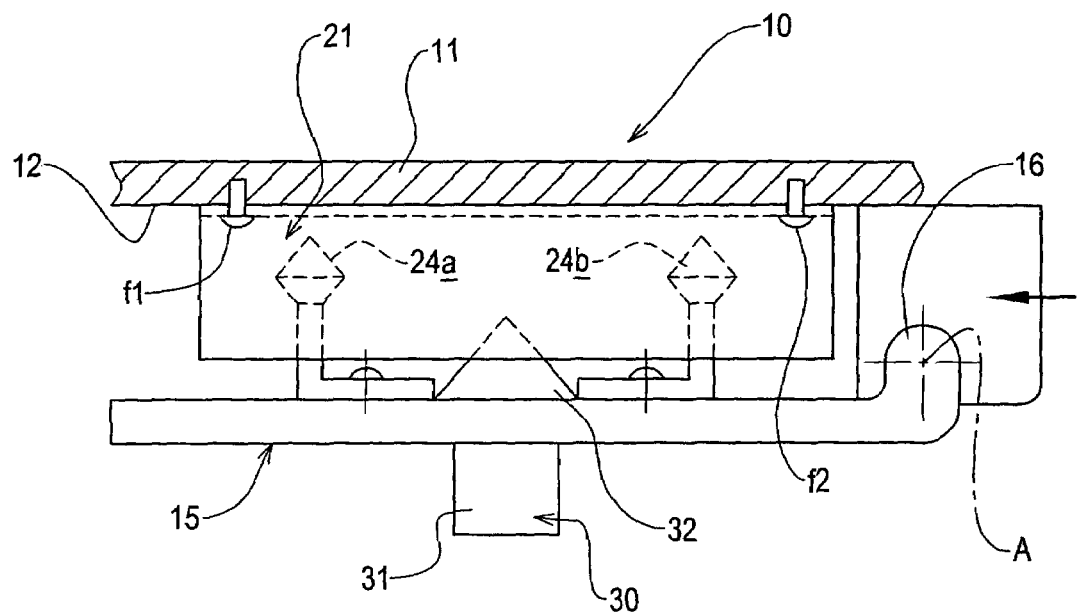
FIG. 3 is an illustrative side view of another embodiment of the invention.
Figure 4:
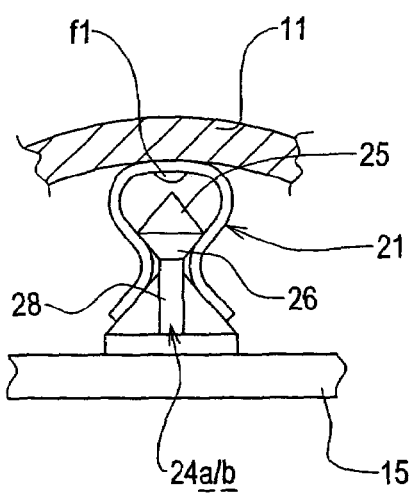
FIG. 4 is an end view of the embodiment of FIG. 3.

Referring now to FIGS. 3 and 4 another embodiment of the invention is shown, again with the parts corresponding to those shown in the embodiment FIGS. 1 and 2, indicated by the same references.

In this embodiment, the holding device 21 is a generally channel shaped member which extends substantially along the length of the flap valve member 15. The channel shaped member 21 has a re-entrant mouth which opens towards the flap valve member 15.

The holding device 21 is secured to the body 11 of the valve 10 by a pair of fasteners which are indicated at f1 and f2.

The valve member 15 carries a pair of retaining members 24a and 24b, both similar in configuration to the retaining member 24 described with reference to FIG. 1. However the head 25 of each retaining member 24a, 24b is received in the re-entrant mouth of the channel shaped holding device 21 so that the lower conical surface 26 of each of the retaining members 24a and 24b are held within the channel shaped holding device.

The limbs of the channel shaped holding device 21 are sufficiently resilient that as the temperature to which the valve 10 is exposed increases to a threshold temperature, a release actuator 30, which again is a wax stat mounted on the valve member 15, acts to urge the limbs of the channel shaped holding device 21 apart so that the retaining members 24a and 24b are released from the mouth of the holding device 21.

There may be provided a torsion spring as indicated at 17 in FIG. 1, or a coil spring as indicated at 17 in FIG. 2, to assist movement of the flap valve member 15 from the open position shown in the drawings, to a closed position when the flap valve member 15 will close a passageway 12 in the body 11 of the valve 10.

In this embodiment, the retaining members each include a generally L-shaped pin 28 which is secured to the valve member by a fastening, but may otherwise be mounted on the valve member 15 as desired.

In this example, the moveable part 32 of the release actuator 30 is conical so as to provide a wedging effect as it moves upwardly between the limbs of the channel shaped holding device 21 to assist moving the limbs apart to release the retaining members 24a and 24b.

Of course if desired in the FIGS. 3 and 4 embodiment, a pair of holding devices 21 may be provided, and for each retaining member although the wax stat 30 or other release actuator will need to be arranged to release each of the retaining members 24a and 24b from engagement with the holding devices 21 simultaneously as the threshold temperature is reached.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A temperature sensitive valve including a body affording a passageway for fluid, a valve member which is moveable relative to the body between first and second positions to control the flow of fluid through the passageway, a retaining member movable with the valve member and being engageable with a holding device to retain the valve member in the first position whilst the temperature is below a threshold value, and there being a release actuator movable when the temperature is at the threshold value, to engage the holding device to cause the retaining member to become disengaged from the holding device, to permit the valve member to move from the first to the second position.

2. A valve according to claim 1 wherein the valve member is pivotal about a pivot axis relative to the body from the first to the second position.

3. A valve according to claim 2 wherein the valve member is a flap which in the first position permits the substantially unimpeded flow of fluid through the passageway, and in the second position engages a valve seat at least substanaitially to close the passageway to the flow of fluid.

4. A valve according to claim 1 wherein a biasing device is provided to bias the valve member towards the second position when the retaining member and holding device are disengaged.

5. A valve according to claim 1 wherein once the valve member has moved to the second position, the valve member remains in the second position even in the event that the temperature falls below the threshold value.

6. A valve according to claim 1 wherein at least one of the retaining member and holding device is moveable by the release actuator to allow the retaining member and holding device to disengage at the threshold temperature.

7. A valve according to claim 6 wherein the release actuator acts to force apart the retaining member and the holding device.

8. A valve according to claim 6 wherein the holding device is a latch which is moveable to release the retaining member.

9. A valve according to claim 8 wherein the latch is pivoted to release the retaining member.

10. A valve according to claim 8 wherein a latch biasing device is provided to assist in retaining the holding device and retaining member in engagement.

11. A valve according to claim 1 wherein the release actuator includes a thermally sensitive substance which expands as the temperature increased towards the threshold temperature, to move a moveable part to disengage the retaining member and holding device at the threshold temperature.

12. A valve according to claim 1 wherein the release actuator is mounted on the valve member.

13. A valve according to claim 1 wherein the release actuator is mounted on the body.

14. A valve according to claim 1, and wherein when the valve member is manually moved from said second position to said first position whilst the temperature is below the threshold value, said retainer member engages said holding device to retain said valve member in said first position.

15. A temperature sensitive valve including a body affording a passageway for fluid, a valve member which is moveable relative to the body between first and second positions to control the flow of fluid through the passageway, a retaining member movable with the valve member and being engageable with a holding device to retain the valve member in the first position whilst the temperature is below a threshold value, and there being a release actuator movable when the temperature is at the threshold value to disengage the retaining member and holding device, to permit the valve member to move from the first to the second position, wherein once the valve member has moved to the second position, the valve member remains in the second position even in the event that the temperature falls below the threshold value, and wherein the holding device is a bifurcated element with resiliently deformable tangs, and the retaining member is a headed pin, the head of the pin being retained between the tangs of the holding element until disengaged therefrom by the action of the release actuator.

16. A temperature sensitive valve including a body affording a passageway for fluid, a valve member which is moveable relative to the body between first and second positions to control the flow of fluid through the passageway, a retaining member movable with the valve member and being engageable with a holding device to retain the valve member in the first position whilst the temperature is below a threshold value, and there being a release actuator movable when the temperature is at the threshold value to disengage the retaining member and holding device, to permit the valve member to move from the first to the second position, wherein at least one of the retaining member and holding device is moveable by the release actuator to allow the retaining member and holding device to disengage at the threshold temperature, and wherein the holding device is a generally channel shaped member with a re-entrant mouth which, when the valve member is in its first position engages with the retaining member to retain the valve member in the first position.

17. A valve according to claim 16 wherein at the threshold temperature the release actuator urges limbs of the channel shaped member of the holding device apart to release the retaining member.

18. A valve according to claim 16, and wherein when the valve member is manually moved from said second position to said first position whilst the temperature is below the threshold value, said retainer member engages said holding device to retain said valve member in said first position.

19. A temperature sensitive valve including a body affording a passageway for fluid, a valve member which is moveable relative to the body between first and second positions to control the flow of fluid through the passageway, a retaining member movable with the valve member and being engageable with a holding device to retain the valve member in the first position whilst the temperature is below a threshold value, and there being a release actuator movable when the temperature is at the threshold value, to force apart the retaining member and the holding device, to permit the valve member to move from the first position to the second position.

20. A valve according to claim 19, and wherein when the valve member is manually moved from said second position to said first position whilst the temperature is below the threshold value, said retainer member engages said holding device to retain said valve member in said first position.

* * * * *